(12) United States Patent
Yao

(10) Patent No.: US 6,400,724 B1
(45) Date of Patent: Jun. 4, 2002

(54) METHOD AND APPARATUS FOR EFFICIENT DATA TRANSMISSION IN A VOICE-OVER-DATA COMMUNICATION SYSTEM

(75) Inventor: Yu-Dong Yao, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/354,494

(22) Filed: Jul. 16, 1999

(51) Int. Cl.$^7$ ................................................ H04L 12/56
(52) U.S. Cl. ........................................ 370/429; 370/412
(58) Field of Search .................................. 370/493, 494, 370/495, 428, 429, 412; 710/39, 40; 714/748, 749

(56) References Cited

U.S. PATENT DOCUMENTS

| | | | | |
|---|---|---|---|---|
| 5,222,061 A | * | 6/1993 | Dashi et al. | 370/394 |
| 5,303,234 A | * | 4/1994 | Kou | 370/442 |
| 5,768,533 A | * | 6/1998 | Ran | 709/247 |
| 5,875,292 A | * | 2/1999 | Taketsugu | 714/18 |
| 6,181,704 B1 | * | 1/2001 | Droltar et al. | 370/410 |
| 6,226,301 B1 | * | 5/2001 | Cheng et al. | 370/474 |
| 6,233,250 B1 | * | 5/2001 | Liu et al. | 370/469 |

OTHER PUBLICATIONS

XP000475152, Chang, Jin–Fu et al.: "End–To End Delay Of An Adaptive Selective Repeat ARQ Protocol", vol. 42, No. 11, Nov. 01, 1999, pp. 2926–2928.

XP002150417, Bai, Yong et al.: "TCP/RLP Coordination And Interprotocol Signaling For Wireless Internet", 49$^{th}$ Vehicular Technology Conference, 16–20 May 1999, pp. 1945–1951.

* cited by examiner

*Primary Examiner*—Douglas Olms
*Assistant Examiner*—Ken Vanderpuye
(74) *Attorney, Agent, or Firm*—Philip R. Wadsworth; Thomas M. Thibault; Abdollah Katbab

(57) ABSTRACT

A method and apparatus for increasing the probability of successful data frame transmission from a transmitter to a receiver. When a data frame is generated by a processor, it is stored in a transmit queue and a copy of the data frame is stored in a secondary queue. An elapsed time device tracks the elapsed time that the data frame copy has been stored in the secondary queue. When no data frames are generated by the processor, data frame copies from the secondary queue are placed into the transmit queue, thereby increasing the redundancy of transmitted data frames and thus the probability of successful transmission to the receiver.

6 Claims, 5 Drawing Sheets

METHOD AND APPARATUS FOR EFFICIENT DATA TRANSMISSION IN A VOICE-OVER-DATA COMMUNICATION SYSTEM

BACKGROUND OF THE INVENTION

I. Field of the Invention

The present invention pertains generally to the field of wireless communications, and more specifically to providing an efficient method and apparatus for transmitting data frames in a voice-over-data communication system.

II. Background

The field of wireless communications has many applications including cordless telephones, paging, wireless local loops, and satellite communication systems. A particularly important application is cellular telephone systems for mobile subscribers. (As used herein, the term "cellular" systems encompasses both cellular and PCS frequencies.) Various over-the-air interfaces have been developed for such cellular telephone systems including frequency division multiple access (FDMA), time division multiple access (TDMA), and code division multiple access (CDMA). In connection therewith, various domestic and international standards have been established including Advanced Mobile Phone Service (AMPS), Global System for Mobile (GSM), and Interim Standard 95 (IS-95). In particular, IS-95 and its derivatives, such as IS-95A, IS-95B (often referred to collectively as IS-95), ANSI J-STD-008, IS-99, IS-657, IS-707, and others, are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. An exemplary cellular telephone system configured substantially in accordance with the use of the IS-95 standard is described in U.S. Pat. No. 5,103,459 entitled "System and Method for Generating Signal Waveforms in a CDMA Cellular Telephone System", which is assigned to the assignee of the present invention and incorporated herein by reference. The aforesaid patent illustrates transmit, or forward-link, signal processing in a CDMA base station. Exemplary receive, or reverse-link, signal processing in a CDMA base station is described in U.S. application Ser. No. 08/987,172, filed Dec. 9, 1997, entitled MULTI-CHANNEL DEMODULATOR, which is assigned to the assignee of the present invention and incorporated herein by reference. In CDMA systems, over-the-air power control is a vital issue. An exemplary method of power control in a CDMA system is described in U.S. Pat. No. 5,056,109 entitled "Method and Apparatus for Controlling Transmission Power in A CDMA Cellular Mobile Telephone System" which is assigned to the assignee of the present invention and incorporated herein by reference.

A primary benefit of using a CDMA over-the-air interface is that communications are conducted simultaneously over the same RF band. For example, each mobile subscriber unit (typically a cellular telephone) in a given cellular telephone system can communicate with the same base station by transmitting a reverse-link signal over the same 1.25 MHz of RF spectrum. Similarly, each base station in such a system can communicate with mobile units by transmitting a forward-link signal over another 1.25 MHz of RF spectrum.

Transmitting signals over the same RF spectrum provides various benefits including an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a mobile unit between the coverage area of two or more base stations that involves simultaneously interfacing with two or more base stations. (In contrast, hard handoff involves terminating the interface with a first base station before establishing the interface with a second base station.) An exemplary method of performing soft handoff is described in U.S. Pat. No. 5,267,261 entitled "Mobile Station Assisted Soft Handoff in a CDMA Cellular Communications System" which is assigned to the assignee of the present invention and incorporated herein by reference.

Under the IS-99 and IS-657 standards (referred to hereinafter collectively as IS-707), an IS-95-compliant communications system can provide both voice and data communications services. Data communications services allow digital data to be exchanged between a transmitter and one or more receivers over a wireless interface. Examples of the type of digital data typically transmitted using the IS-707 standard include computer files and electronic mail.

In accordance with both the IS-95 and IS-707 standards, the data exchanged between a transmitter and a receiver is processed in discreet packets, otherwise known as data packets or data frames, or simply frames. To increase the likelihood that a frame will be successfully transmitted during a data transmission, IS-707 employs a radio link protocol (RLP) to track the frames transmitted successfully and to perform frame retransmission when a frame is not transmitted successfully. Re-transmission is performed up to three times in IS-707, and it is the responsibility of higher layer protocols to take additional steps to ensure that frames are successfully received.

In order to track which frames have been received successfully, IS-707 uses an eight-bit sequence number to be included as a frame header in each frame transmitted. The sequence number is incremented for each frame from 0 to 256 and then reset back to zero. An unsuccessfully transmitted frame is detected when a frame with an out-of-order sequence number is received, or an error is detected using CRC checksum information or other error detection methods. Once an unsuccessfully received frame is detected, the receiver transmits a negative-acknowledgment message (NAK) to the transmit system that includes the sequence number of the frame that was not received/ The transmit system then re-transmits the frame including the sequence number as originally transmitted. If the re-transmitted frame is not received successfully, a second retransmission request, consisting of two NAKs, is sent to the transmit system, this time requesting that the frame be transmitted twice. If the frame is still not received successfully, a third retransmission request, consisting of three NAKs, is sent to the transmit system, this time requesting that the frame be transmitted three times. If the frame is still not received successfully after the third retransmission request, no further retransmissions are requested, and the frame is ignored at the receiver for use in reconstructing the original data.

Recently, a need has arisen for transmitting voice information using the data protocols of IS-707. For example, in a secure communications system, voice information may be more easily manipulated and distributed among data networks using a data protocol. In such applications, it is desirable to maintain the use of existing data protocols so that no changes to existing infrastructure are necessary. However, problems occur when transmitting voice using a data protocol, due to the nature of voice characteristics.

One of the primary problems of transmitting audio information, such as voice, using a data protocol is the delays associated with frame re-transmissions using an over-the-air data protocol such as RLP. Delays of more than a few hundred milliseconds in speech can result in unacceptable voice quality. When transmitting data, such as computer files, time delays are easily tolerated due to the non real-time nature of data. As a consequence, the protocols of IS-707 can afford to use the frame re-transmission scheme as described above, which may result in transmission delays, or a latency period, of more than a few seconds. Such a latency period is unacceptable for transmitting voice information.

What is needed is a method and apparatus for minimizing the problems caused by the time delays associated with frame retransmission requests from a receiver. Furthermore, the method and apparatus should be backwards compatible with existing infrastructure to avoid expensive upgrades to those systems.

SUMMARY OF THE INVENTION

The present invention is a method and apparatus for increasing the probability of successful data frame transmission from a transmitter to a receiver. This is achieved in general by transmitting duplicate copies of the transmitted data during periods of low-rate or inactive frame transmission.

The present invention is an apparatus located within a transmitter, the transmitter comprising a processor for transmitting data frames in accordance with any well-known data transmission protocol. In the exemplary embodiment, the Radio Link Protocol (RLP), as defined by Interim Standard IS-99, is used. The transmitter further comprises a transmit queue and a secondary queue. When information is available to be transmitted, the processor generates data frames corresponding to the information to be transmitted. The data frames are stored in the transmit queue and a copy of at least one of the data frames is stored in the secondary queue. Data frames in the transmit queue are sent at a predetermined rate. Subsequently, if no information is available for transmission, a data frame will not be generated by the processor, and a data frame copy from the secondary queue is placed into the transmit queue, thereby increasing the redundancy of transmitted data frames and thus the probability of successful transmission to the receiver.

In a second embodiment of the present invention, the transmitter further comprises an elapsed time device, which tracks the elapsed time that each data frame copy has been stored in the secondary queue. If the elapsed time for any data frame copy is greater than or equal to a predetermined time period, the processor erases the corresponding data frame copy from the secondary queue.

The present invention can also be described as a method for increasing the probability of successful data frame transmission between a transmitter and a receiver. The method comprises the steps of generating data frames from information; to be transmitted and storing the data frames into a transmit queue. A copy of at least one of the data frames is generated and stored in a secondary queue. Subsequently, if a data frame is not generated by the processor, a data frame copy from the secondary queue is placed sequentially into the transmit queue, thereby increasing the redundancy of transmitted data frames and thus the probability of successful transmission to the receiver.

DETAILED DESCRIPTION OF THE PREFERRED EMBODIMENTS

The embodiments described herein are described with respect to a wireless communication system operating in accordance with the use of CDMA signal processing techniques of the IS-95, IS-707, and IS-99 Interim Standards. While the present invention is especially suited for use within such a communications system, it should be understood that the present invention may be employed in various other types of communications systems that transmit information in discreet packets, otherwise known as data packets, data frames, or simply frames, including both wireless and wireline communication systems, and satellite-based communication systems. Additionally, throughout the description, various well-known systems are set forth in block form. This is done for the purpose of clarity.

Various wireless communication systems in use today employ fixed base stations that communicate with mobile units using an over-the-air interface. Such wireless communication systems include AMPS (analog), IS-54 (North American TDMA), GSM (Global System for Mobile communications TDMA), and IS-95 (CDMA). In a preferred embodiment, the wireless communication system comprises a CDMA system.

Figure 1:
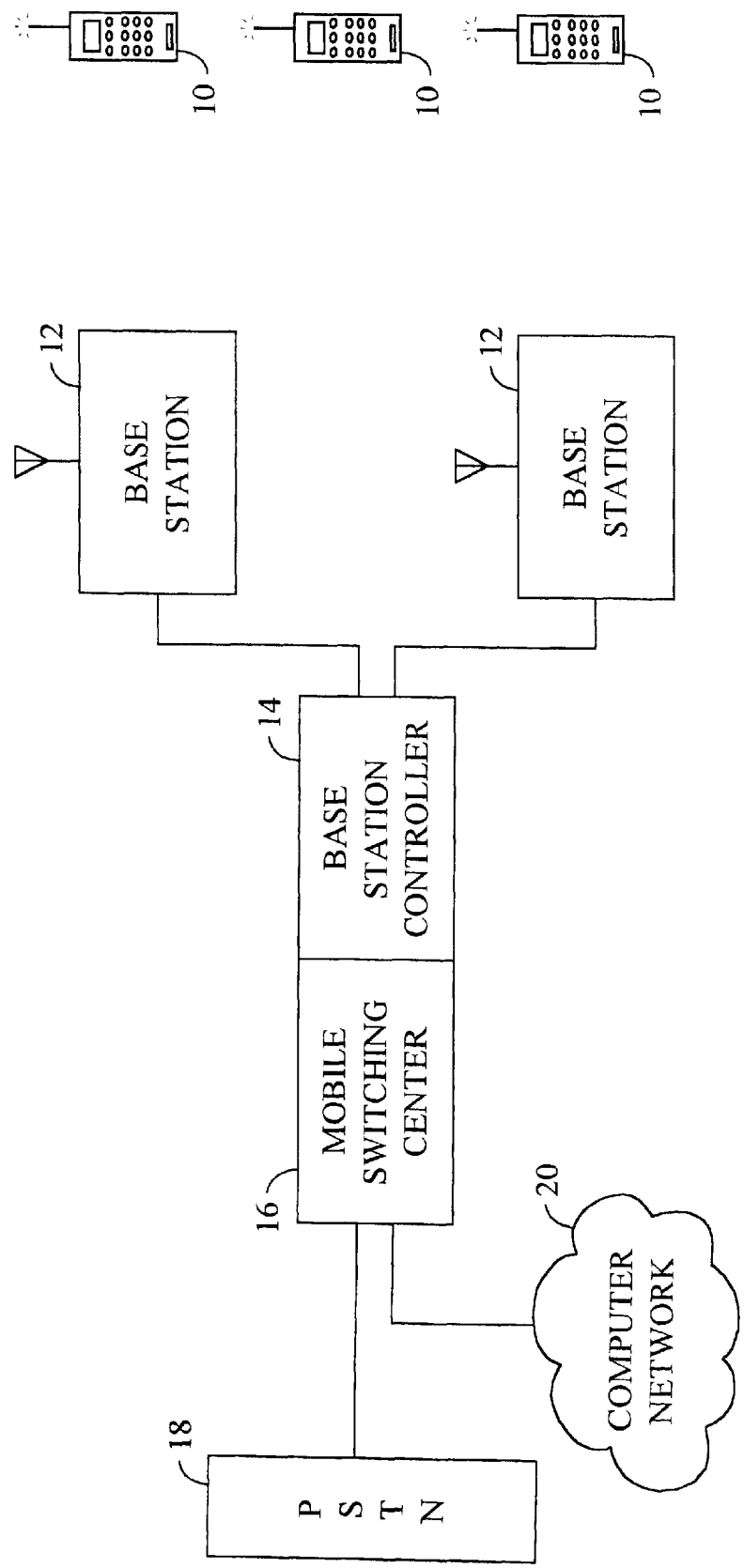
FIG. 1 is a block diagram of a wireless communication system in which the present invention may be used.

As illustrated in FIG. 1, a CDMA wireless communication system generally includes a plurality of wireless communication devices 10, a plurality of base stations 12, a base station controller (BSC) 14, and a mobile switching center (MSC) 16. Wireless communication device 10 is typically a wireless telephone, although wireless communication device 10 could alternatively comprise a computer equipped with a wireless modem, or any other device capable of transmitting and receiving acoustic or numerical information to another communication device. Base station 12, while shown in FIG. 1 as a fixed base station, might alternatively comprise a mobile communication device, a satellite, or any other device capable of transmitting and receiving communications from wireless communication device 10.

MSC 16 is configured to interface with a conventional public switch telephone network (PSTN) 18 or directly to a computer network, such as Internet 20. MSC 16 is also configured to interface with BSC 14. BSC 14 is coupled to each base station 12 via backhaul lines. The backhaul lines may be configured in accordance with any of several known interfaces including E1/T1, ATM, or IP. It is to be understood that there can be more than one BSC 14 in the system. Each base station 12 advantageously includes at least one sector (not shown), each sector comprising an antenna pointed in a particular direction radially away from base station 12. Alternatively, each sector may comprise two antennas for diversity reception. Each base station 12 may advantageously be designed to support a plurality of frequency assignments (each frequency assignment comprising 1.25 MHz of spectrum). The intersection of a sector and a frequency assignment may be referred to as a CDMA channel. Base station 12 may also be known as base station transceiver subsystem (BTS) 12. Alternatively, "base station" may be used in the industry to refer collectively to BSC 14 and one or more BTSs 12, which BTSs 12 may also be denoted "cell sites" 12. (Alternatively, individual sectors of a given BTS 12 may be referred to as cell sites.) Mobile subscriber units 10 are typically wireless telephones 10, and the wireless communication system is advantageously a CDMA system configured for use in accordance with the IS-95 standard.

During typical operation of the cellular telephone system, base stations 12 receive sets of reverse-link signals from sets of mobile units 10. The mobile units 10 transmit and receive voice and/or data communications. Each reverse-link signal received by a given base station 12 is processed within that base station 12. The resulting data is forwarded to BSC 14. BSC 14 provides call resource allocation and mobility management functionality including the orchestration of soft handoffs between base stations 12. BSC 14 also routes the received data to MSC 16, which provides additional routing services for interface with PSTN 18. Similarly, PSTN 18 and internet 20 interface with MSC 16, and MSC 16 interfaces with BSC 14, which in turn controls the base stations 12 to transmit sets of forward-link signals to sets of mobile units 10.

In accordance with the teachings of IS-95, the wireless communication system of FIG. 1 is generally designed to permit voice communications between mobile units 10 and wireline communication devices through PSTN 18. However, various standards have been implemented, including, for example, IS-707 and IS-99, which permit the transmission of data between mobile subscriber units 10 and data communication devices through either PSTN 18 or Internet 20. Examples of applications which require the transmission of data instead of voice include email applications or text paging. IS-707 and IS-99 specify how data is to be transmitted between a transmitter and a receiver operating in a CDMA communication system.

The protocols contained within IS-707 and IS-99 to transmit data are different than the protocols used to transmit audio information, as specified in IS-95, due to the properties associated with each data type. For example, the permissible error rate while transmitting audio information can be relatively high, due to the limitations of the human ear. A typical permissible frame error rate in an IS-95 compliant CDMA communication system is one percent, meaning that one percent of transmitted frames can be received in error without a perceptible loss in audio quality.

In a data communication system, the error rate must be much lower than in a voice communication system, because a single data bit received in error can have a significant effect on the information being transmitted. A typical error rate in such a data communication system, specified as a Bit Error Rate (BER) is on the order of $10^{-9}$, or one bit received in error for every billion bits received.

In an IS-707 or IS-99 compliant data communication system, information is transmitted in 20 millisecond data packets, otherwise known as data frames, or simply frames. A frame which has been received in error (also known as an error frame or a bad frame), can be defined as a received frame containing errors or a frame which was transmitted but never received. Upon detection of a bad frame, a re-transmission request is sent by the receiver requesting that the bad frame be re-transmitted. In a CDMA compliant system, the re-transmission request is known as a negative-acknowledgement message, or NAK. The NAK informs the transmitter which frame or frames to re-transmit corresponding to the bad frame(s). When the transmitter receives the NAK, a duplicate copy of the data frame is retrieved from a memory buffer and is then re-transmitted to the receiver.

In accordance with the teachings of IS-707, if the bad frame is not successfully received within a predetermined amount of time after sending the initial NAK, a second re-transmission request is sent to the transmitter in the form of two NAKs, each NAK specifying that the bad frame be re-transmitted, one re-transmission for each NAK sent. The purpose of multiple re-transmissions is to increase the probability of successfully receiving a frame.

If the bad frame is still not received within a second predetermined amount of time from when the second re-transmission request was sent, a third re-transmission request is sent by the receiver in the form of three NAKs, each NAK specifying that the bad frame be re-transmitted, one retransmission for each NAK sent. If the frame is still not received within a third predetermined amount of time from when the third re-transmission request was sent, no further re-transmission requests are sent and the frame is ignored at the receiver for use in reconstructing the original data. Higher layer protocols will take additional steps to ensure that the data frame is successfully received. The original predetermined time period for response, the second predetermined time, and the third predetermined time may be equal to one another, or they may be set to different values. In addition, the three predetermined time periods may be dynamically adjustable, depending on the transmission quality of the channel. This may be measured by monitoring the error rate at which data is received using techniques well-known in the art.

When a NAK is generated by a receiver, it may request re-transmission of one or more frames. IS-99 specifies the format of a typical NAK message, comprising at least a control field and two sequence fields: In the exemplary embodiment, the control field is four bits long,.and each of the sequence fields is 8 bits long. A NAK is specified as the control field being equal to binary '1100', the first sequence field specifying the first frame to be re-transmitted, and the second sequence number specifying the last frame to be transmitted All frames between the first sequence number and the last sequence number will be re-transmitted. For example, a message containing 1100 in the control field followed by 0011010 in the first control field, then 11100001 in the second control field specifies that the current message is a NAK, and to re-transmit frames 26 through 225.

The NAK format specified above allows up to 255 frames to be retransmitted. However, under most circumstances, only a small number of consecutive frames are received in error. In addition, other communication systems may need to shorten the length of messages, therefore a reduction in the NAK message is desirable. In one embodiment of the present invention, a new NAK message is defined having one of the sequence fields shortened from 8 bits to 4 bits. The 4 bit field represents the number of consecutive frames to be re-transmitted beginning at the identified frame in the 8 bit sequence field. For example, the first sequence field is still 8 bits long, specifying a beginning frame number to be re-transmitted. The second sequence field is 4 bits long and specifies the number of consecutive frames to be transmitted, starting with the beginning frame in the first sequence field. Of course, the first sequence field could alternatively specify the number of frames to be re-transmitted and the second sequence field could specify the beginning frame number. Other variations include having the 4 bit field specify a number of frames to be transmitted prior to the beginning frame. It should be understood that the shortened sequence number could alternatively have a shorter or longer bit length, depending on the number of consecutive frames generally expected to be re-transmitted.

The re-transmission scheme just described introduces a time delay in correctly receiving a frame which has initially been received in error. The time delay is caused by the multiple requests for frame retransmission and the time spent by the receiver waiting to see if a first, second, or third re-transmission request has succeeded. Usually, this time delay does not have an adverse effect when transmitting data. However, when transmitting audio information using the protocols of a data communication system, the time delay associated with re-transmission requests is unacceptable, as it introduces a noticeable loss of audio quality to listeners.

The present invention attempts to avoid the entire re-transmission process, and, thus, the delay associated with it, by increasing the probability of frames being successfully transmitted and received in the first place. Generally, duplicate copies of transmitted data frames are sent when an excess in transmission capacity occurs during transmissions. An excess in transmission capacity occurs when no information is available to be transmitted, hence no new data frames being transmitted. For example, short periods of silence between words, or even syllables, in human speech will result in little or no information to be transmitted during a wireless telephone conversation. The present invention allows duplicate data frame copies to be transmitted during such periods of excess capacity, thereby increasing the redundancy of each frame transmitted, and thus increasing the probability of successful transmission.

Figure 2:
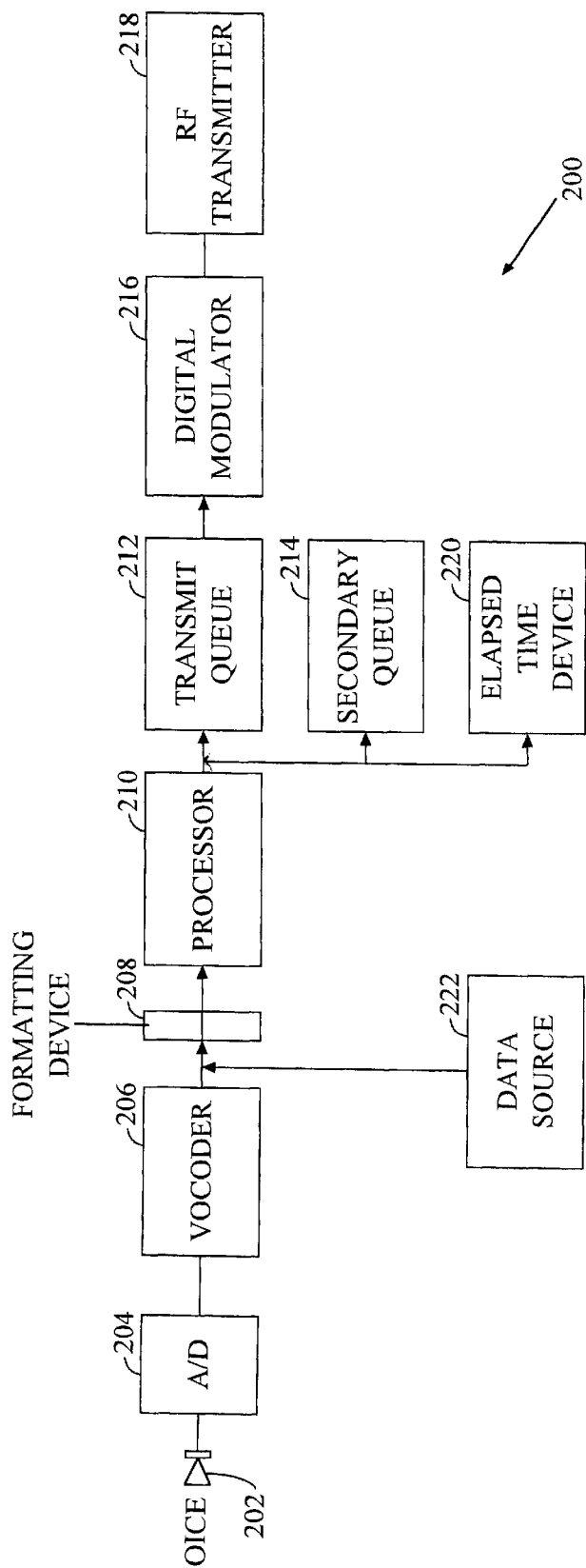
FIG. 2 illustrates a block diagram of a transmitter used in the wireless communication system of FIG. 1.

FIG. 2 illustrates a transmitter 200 in block diagram format, configured in accordance with an exemplary embodiment of the present invention. Such a transmitter 200 may be located in a base station 12 or in a mobile unit 10. It should be understood FIG. 2 is a simplified block diagram of a complete transmitter and that other functional blocks have been omitted for clarity. In addition, transmitter 200 as shown in FIG. 2 is not intended to be limited to any one particular-type of transmission modulation, protocol, or standard.

Referring back to FIG. 2, audio data, typically referred to as voice data, is entered into transmitter 200 using microphone 202. Microphone 202 converts acoustic signals into electrical signals for processing by analog-to-digital converter A/D 204. A/D 204 uses well-known techniques to transform the analog electrical signal from microphone 202 into a digital signal. For example, A/D 204 performs low-pass filtering, sampling, quantizing, and binary encoding on the analog voice signal from microphone 202 to produce a digitized voice signal.

The digitized voice signal is then provided to vocoder 206. Vocoder 206 is a well-known device for compressing the digitized voice signal to minimize the bandwidth required for transmission. Vocoder 206 generates vocoder frames, otherwise known as data packets, otherwise known as data frames, or simply frames, generally at regular time intervals, such as every 20 milliseconds in the exemplary embodiment, although other time intervals could be used in the alternative.

One way that many vocoders maximize signal compression is by detecting periods of silence in a voice signal. For example, pauses in human speech between sentences, words, and even syllables present an opportunity for many vocoders to compress the bandwidth of the voice signal by producing a data frame having little or no information contained therein. Such a data frame is typically known as a low rate frame.

Vocoders may be further enhanced by offering variable data rates within the data frames that they produce. An example of such a variable rate vocoder is found in U.S. Pat. No. 5,414,796 (the '796 patent) entitled "VARIABLE RATE VOCODER", assigned to the assignee of the present invention and incorporated by reference herein. When little or no information is available for transmission, variable rate vocoders produce data frames at reduced data rates, thus increasing the transmission capacity of the wireless communication system. In the variable rate vocoder described by the '796 patent, data frames comprise data at either full, one half, one quarter, or one eighth the data rate of the highest data rate used in the communication system.

In typical voice communications, data frames from vocoder 206, known as vocoder frames, are put into a queue, or sequential memory, to be digitally modulated and then upconverted for wireless transmission. However, in some applications, it is desirous to transmit voice signals as data packets rather than vocoder frames. Data packets can be easily manipulated for such applications as voice encryption using, for example, public-key encryption techniques. Data packets can also be easily transmitted between a large interconnection of computer networks, such as the Internet.

In the exemplary embodiment, vocoder frames from vocoder 206 are provided to formatting device 208, where they are transformed into data packets suitable for the particular type of data protocol used for wireless transmission. For example, in the exemplary embodiment, the frames from vocoder 206 are formatted into TCP/IP frames. TCP/IP is a pair of well-known data protocols used to transmit data over large public computer networks, such as the Internet. Other well-known data protocols may be used in the alternative. Formatting device 208 may be a hardware device, either discreet or integrated, or it may comprise a microprocessor running a software program specifically designed to transform vocoder frames into data packets suitable for the particular data protocol at hand.

Formatting device 208 may also accept data, rather than audio information, from data source 222. Examples of data source 222 are facsimile machines, digital cameras, computer files, email devices, and so on. Data from data source 222 may be formatted into data frames like the vocoder frames from vocoder 206, or they may not be formatted at all. Formatting device 208 converts the data from data source 222 into data packets in accordance with the data transmission protocols in use by the communication system, such as TCP/IP. In an alternative embodiment, data source 222 provides data to a formatting device 208 dedicated to converting data from data source 222 only, and a second formatting device 208 processes vocoder frames from vocoder 206.

Formatting device 208 may also provide other data processing on incoming data. For example, incoming data may be digitally encrypted by formatting device 208 using any one of a variety of well-known techniques. After encrypting the incoming data, formatting device 208 converts the encrypted data into data packets in accordance with the chosen data protocol.

Figure 3:
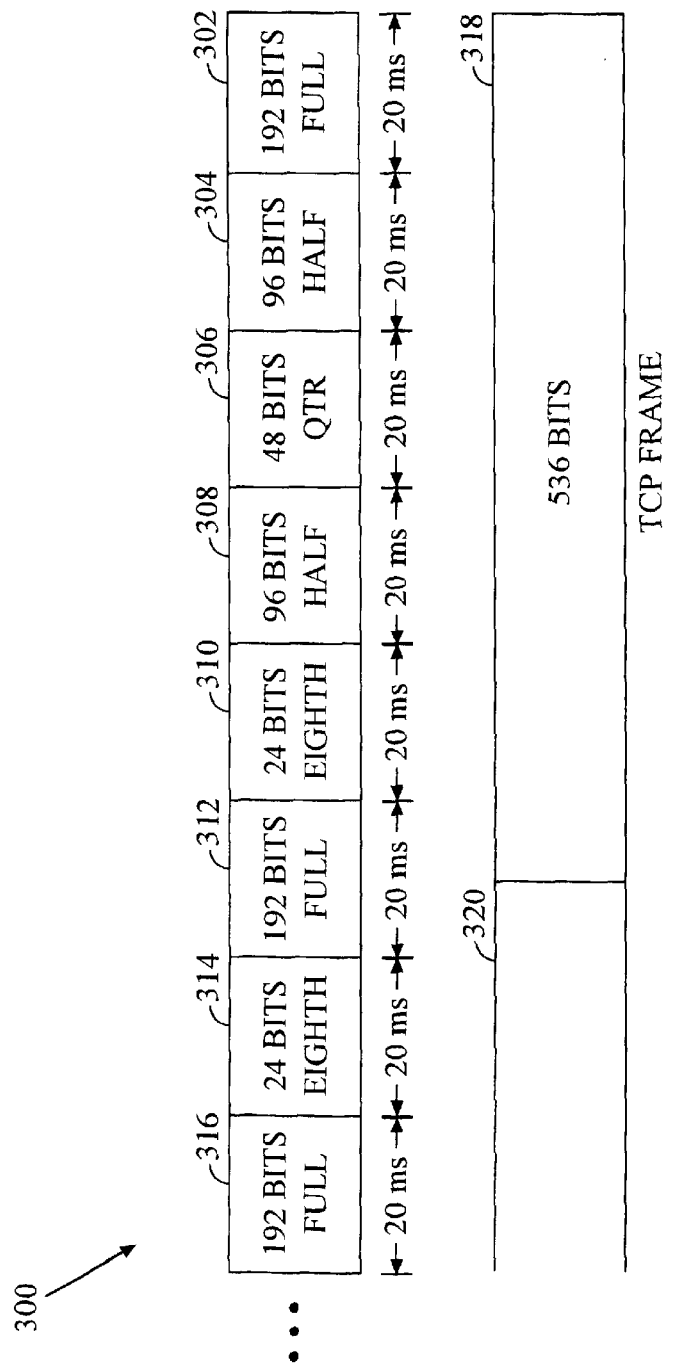
FIG. 3 illustrates how vocoder frames are converted into TCP frames by a formatting device located within the transmitter of FIG. 2.

FIG. 3 illustrates how variable-rate vocoder frames are converted into TCP frames by formatting device 208. Data stream 300 represents the output of vocoder 206, shown as a series of sequential vocoder frames, each vocoder frame having a frame length of 20 milliseconds. It should be understood that other vocoders could generate vocoder frames having frame lengths of a greater or smaller duration.

As shown in FIG. 3, each vocoder frame contains a number of information bits depending on the data rate for the particular frame. In the present example of FIG. 3, vocoder frames contain data bits equal to 192 for a full rate frame, 96 bits for a half rate frame, 48 bits for a quarter rate frame, and 24 bits for an eighth rate frame. As explained above, frames having high data rates represent periods of voice activity, while frame having lower data rates are representative of periods of less voice activity or silence.

TCP frames are characterized by having a duration measured by the number of bits contained within each frame. As shown in FIG. 3, a typical TCP frame length can be 536 bits, although other TCP frames may have a greater or smaller number of bits. Formatting device 208 fills the TCP frame sequentially with bits contained in each vocoder frame generated by vocoder 206. For example, in FIG. 3, the 192 bits contained within vocoder frame 302 are first placed within TCP frame 318, then the 96 bits from vocoder frame 304, and so on until 536 bits have been placed within TCP frame 318. Note that vocoder frame 312 is split between TCP frame 318 and TCP frame 320 as needed to fill TCP frame 318 with 536 bits.

It should be understood that TCP frames are not generated by processor 208 at regular intervals, due to the nature of the variable rate vocoder frames. For example, if no information is available for transmission, for instance no voice information is provided to microphone 202, a long series of low-rate vocoder frames will be produced by vocoder 206. Therefore, many frames of low-rate vocoder frames will be needed to fill the 536 bits needed for a TCP frame, and, thus, a TCP frame will be produced more slowly. Conversely, if high voice activity is present at microphone 202, a series of high-rate vocoder frames will be produced by vocoder 206. Therefore, relatively few vocoder frames will be needed to fill the 536 bits necessary for a TCP frame, thus, a TCP frame will be generated more quickly.

The formatted data frames from formatting device 208 (TCP frames, in this example) are provided to processor 210. Processor 210 is typically a wellknown digital microprocessor based on the Intel family of microprocessors, or processor 210 may be a microprocessor integrated into an Application Specific Integrated Circuit (ASIC) along with other peripheral support devices such as timers, counters, memory, and other devices well known in the art.

Processor 210 receives the TCP frames from formatting device 208 and re-formats them in accordance with a predetermined over-the-air transmission protocol. For example, in a CDMA communication system based upon Interim Standard IS-95, data packets are transmitted using the well-known Radio Link Protocol (RLP) as described in Interim Standard IS-99 and IS-707. RLP specifies data to be transmitted in 20 millisecond frames, herein referred to as RLP frames. In accordance with IS-99, RLP frames comprise an RLP frame sequence field, an RLP frame type field, a data length field, a data field for storing information from TCP frames provided by formatting device 208, and a field for placing a variable number of padding bits.

Processor 210 receives TCP frames from formatting device 208 and typically stores the TCP frames in a buffer (not shown). RLP frames are then generated from the TCP frames using techniques well-known in the art. As RLP frames are produced by processor 210, they are placed into transmit queue 212. Transmit queue 212 is a storage device for storing RLP frames prior to transmission, generally on a first-in, first-out basis. Transmit queue 212 provides a steady source of RLP frames to be transmitted, even though a constant rate of RLP frames is generally not supplied by processor 210. Transmit queue 212 is a memory device capable of storing multiple data packets, typically 100 data packets or more. Such memory devices are commonly found in the art.

As long as there exists RLP frames in transmit queue 212, a steady stream of data packets will be available for transmission and no gaps in the transmission will occur. However, if processor 210 does not provide RLP frames at an average rate to keep at least one RLP frame stored inside transmit queue 212, a gap will occur which will disrupt the predetermined data communication protocol. This will occur if TCP frames are not generated at a minimum rate, representing little or no information to be transmitted from microphone 202 or data source 222. Present communication systems have overcome this problem by having processor 210 generate what is commonly referred to as idle frames when a lack of TCP frames are available to processor 210. Idle frames contain no information bits in the data field.

The present invention increases the probability of successful RLP frame transmission by transmitting duplicate RLP frames in place of idle frames. As processor 210 generates RLP frames, at least a portion of those frames are duplicated and stored in secondary queue 214. In one embodiment of the present invention, every RLP frame generated by processor 210 is duplicated and stored in secondary queue 214. Secondary queue 214 is a storage device such as a random access memory (RAM) for storing copies of the RLP frames generated by processor 210. Secondary queue 214 stores data frame copies on a first-in, first-out basis, similar to transmit queue 212. That is, data frame copies that are stored first in secondary queue 214 will be the first to be placed into transmit queue 212 as the need arises, as explained below.

As mentioned previously, in one embodiment of the present invention, every data frame generated by processor 210 is duplicated and stored in secondary queue 214. The following description of the present invention pertains to this embodiment, however, it should be understood that in other embodiments, not every data frame generated by processor 210 is duplicated and stored in secondary queue 214. In other embodiments, for example, every other data frame could be duplicated, or a predetermined number of sequential data frames could be duplicated and stored. In yet another embodiment, multiple copies of each data frame or selected frames could be generated and stored in secondary queue 214. Finally, the present description assumes that transmit queue 212 and secondary queue 214 are filled sequentially, however, this need not be the case. As long as data frames can be re-constructed in the order that they were generated at a receiver, data frames can be stored in any suitable arrangement.

As processor 210 generates data frames, i.e. RLP frames, a copy of each data frame is stored in secondary queue 214. If no information is available to be transmitted from either microphone 202 or data source 222, in other words, if no data is available for processor 210 to generate data frames, processor 210 places a data frame copy from secondary queue 214 into transmit queue 212 at predetermined time intervals generally equal to the frame length defined by the particular transmission protocol in use. For example, in the RLP protocol under IS-707, each frame is 20 milliseconds in length. Therefore, processor 210 places data frame copies from secondary queue 214 into transmit queue 212 every 20 milliseconds as long as processor 210 does not have any data to be processed from formatting device 208.

Figure 4:
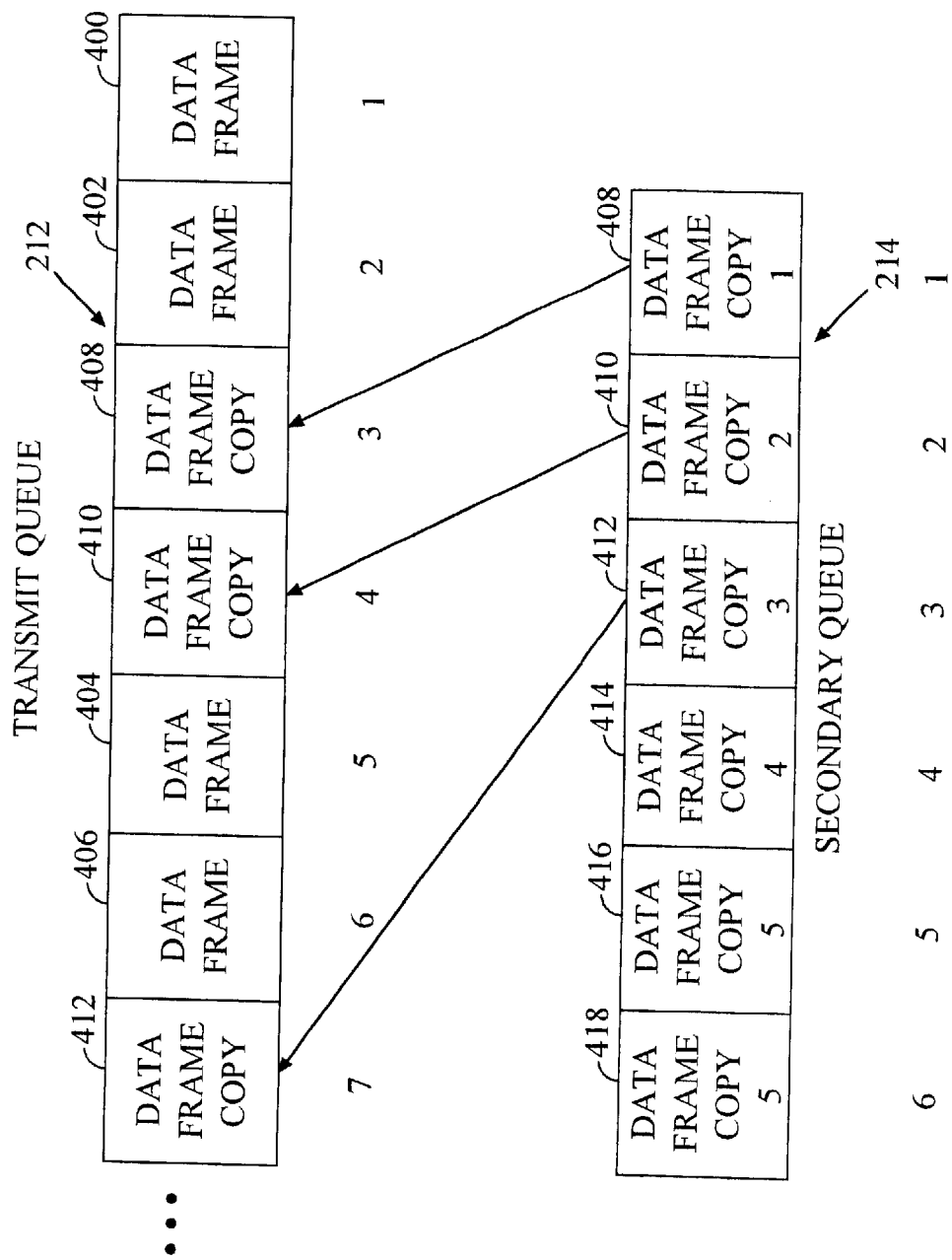
FIG. 4 illustrates how a data frame copy is placed from a secondary queue into a transmit queue.

FIG. 4 illustrates how data frame copies are placed from secondary queue 214 into transmit queue 212. In this example, it is assumed that transmit queue 212 and secondary queue 214 begin empty, and that data frames are filled in a sequential arrangement, beginning with position 1 shown on the right. However, the present invention operates in the same manner whether transmit queue 212 and secondary queue 214 are empty or not.

When information is available for transmission from formatting device 208, i.e. TCP frames, processor 210 generates data frames, i.e. RLP frames of 20 milliseconds in the exemplary embodiment. Processor 210 first generates data frame 400 and places it sequentially into transmit queue 212, in this example, in position 1. A copy of data frame 400, data frame copy 408, is also generated by processor 210 and data frame copy 408 is stored sequentially in secondary queue 214, in this example, in position 1. Next, processor 210 generates data frame 402 from the available data provided by formatting device 208, and also a copy of data frame 402, data frame copy 410, placing data frame 402 sequentially into transmit queue 212 at position 2 and data frame copy 410 sequentially into secondary queue 214 at position 2.

Next, in this example, no data is available to be transmitted from formatting device 208, so, instead of generating an idle frame, processor 210 places the first available data frame copy from secondary queue 214, in this case data frame copy 408, sequentially into transmit queue 212 at position 3. In general, once data frame copy 408 has been placed within transmit queue 212, it is erased from secondary queue 214, thus freeing memory space inside secondary queue 214 so that another data frame copy can be stored. This can be accomplished by one of a number of different methods well-known in the art, such as shifting the remaining data frame copies inside of secondary queue 214 so that data frame copy 410 occupies the first position inside secondary queue 214, data frame copy 412 occupies the second position inside secondary queue 214, and so on. Another method for freeing memory space inside of secondary queue 214 is to use a pointer to point to the next data frame copy to be placed inside transmit queue 212 after a data frame copy has been placed inside of transmit queue 212 and overwriting that position with a new data frame copy as it is generated from processor 210.

Referring back to FIG. 4, if still no data is available from formatting device 208, processor 210 places the next available data frame copy from secondary queue 214 into transmit queue 212. As shown in FIG. 4, data frame copy 410 from secondary queue 214, position 2, is placed into transmit queue 212 at position 4. Processor 210 continues to generate data frames if data is available from formatting device 208, placing the data frames into transmit queue 214 and generating a copy of each data frame and storing the copies in secondary queue 214. If no data is available to be transmitted, evidenced by a lack of data from formatting device 208, data frame copies are retrieved by processor 210 from secondary queue 214 and placed sequentially into transmit queue 212.

As previously mentioned, data frames are removed from transmit queue 214 at predetermined time intervals equal to 20 milliseconds in the exemplary embodiment. Referring back to FIG. 2, the data frames are then provided to digital modulator 216, which modulates the data frames in accordance with the chosen modulation technique of the communication system, for example, AMPS, TDMA, CDMA, or others. In the exemplary embodiment, digital modulator 216 operates in accordance with the teachings of IS-95. After the data frames have been-modulated, they are provided to RF transmitter 218 where they are upconverted and-transmitted, using techniques well-known in the art.

In a second embodiment of the present invention, data frame copies are stored in secondary queue 214 for a predetermined time period. Data frame copies which have been stored in secondary queue 214 for an elapsed time greater than the predetermined time are erased from secondary queue 214, allowing other data frame copies to be stored instead. In general, the predetermined time period is equal to the round trip delay between transmitter 200 and a receiver in communication with transmitter 200. The round trip delay time, in general, is the amount of time needed for a data frame to travel between a transmitter and a receiver, and back. In the present case, this allows time for the receiver to notify transmitter 200 that one or more frames were not received successfully. The reason that data frames are erased after the predetermined time period is that they are no longer needed if a successful transmission has taken place.

In many wireless transmission protocols, including RLP, a negative acknowledgment (NAK) message is transmitted from the receiver to transmitter 200, identifying any frame or frames that were not received successfully. Typically, in response to the NAK, the identified frame(s) are re-transmitted by transmitter 200 at least once more. Data frame copies are thus held in secondary queue until it is clear that corresponding data frames have been successfully received. If a NAK is received by transmitter 200, the data frame copy (copies) can be re-transmitted by retrieving them from secondary queue 214 and placing them into transmit queue 212, as described above. The re-transmitted copies will generally be held in secondary queue 214 until, again, the predetermined time period has elapsed. This sequence may be repeated, as necessary.

Referring back to FIG. 2, elapsed time device 220 tracks the elapsed time that each data frame copy has been stored in secondary queue 214. Elapsed time device 220 may comprise counters, timers, clocks, memory, comparator means, or any combination of the above to track the elapsed storage time. Alternatively, elapsed time device 220 could be incorporated into processor 210. As a data frame copy is generated and stored in secondary queue 214 by processor 210, elapsed time indicator 220 is notified by processor 210, and elapsed time device 220 begins tracking the elapsed time that the data frame copy has been stored in secondary queue 214. This is accomplished, generally, by using one or more counters, which are well-known in the art. In a first embodiment, when a data frame copy has been stored in secondary queue 214 for a time period equal to or greater than a predetermined time period, the data frame is erased from secondary queue 214 because it is assumed that the data frame to which it is associated with has been successfully transmitted.

Figure 5:
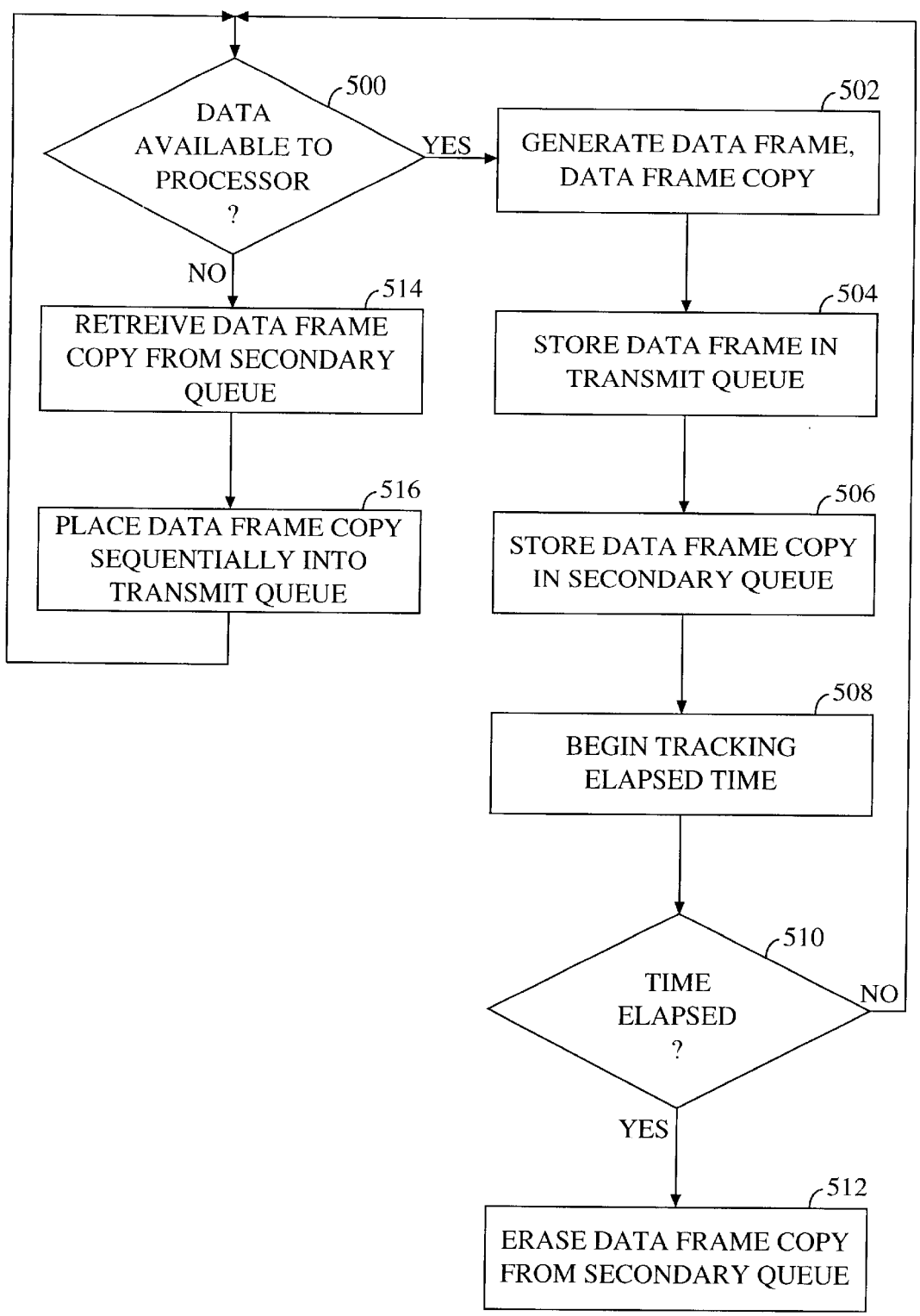
FIG. 5 is a flow diagram detailing the operation of the transmitter of FIG. 2 during transmission in accordance with the teachings of the present invention.

FIG. 5 is a block diagram detailing one embodiment of the method of the present invention. At step 500, processor 208 determines whether or not there is any data available from formatting device 208 to be transmitted. Data is typically provided to processor 210 in the form of data packets, formatted for a particular data communication protocol such as the well-known TCP/IP protocol.

If data is available to be transmitted in step 500, processor 210 generates a data frame, generally in accordance with a wireless transmission protocol such as the well-known RLP protocol, and a copy of the data frame, shown as step 502. In another embodiment, more than one data frame copy is generated for each data frame produced.

After the data frame and data frame copy have been generated by processor 210 at step 502, the data frame is stored in transmit queue 212, as shown in step 504 and the data frame copy is stored in secondary queue 214, as shown in step 506.

In the exemplary embodiment, elapsed time device 220 begins tracking the elapsed time that the data frame copy was stored in secondary queue 214, as shown in step 508. Data frame copies are erased from secondary queue 214 after a predetermined time period, in the exemplary embodiment, the round trip delay time.

In step 510, processor 210 determines whether the elapsed time is equal to or greater than the predetermined time period. In the exemplary embodiment, if the elapsed time is equal to or greater than the predetermined time period, the data frame copy associated with the elapsed time is erased from secondary queue 214, as shown in step 512.

If the elapsed time is not equal to or greater than the predetermined time period, step 500 is again performed by processor 210 determining whether or not data is available to be transmitted. It should be understood that the process of determining if an elapsed time is equal or greater than the predetermined time can be performed in the sequence shown in FIG. 5, or it can be performed simultaneously with the other steps by a second processor or by elapsed time device 220.

In step 500, if no data is available to be transmitted, i.e. no data has been provided to processor 210 by formatting device 208, processor retrieves a data frame copy from secondary queue 214 and places it into transmit queue 212, as shown in steps 514 and 516, respectively. Step 500 is then repeated with processor 210 determining if data is available to be transmitted.

The preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What I claim is:

1. Apparatus for increasing the probability of successful data frame transmission from a transmitter to a receiver, comprising:

a transmit queue for storing data frames;

a secondary queue for storing a copy of at least one of said data frames; and a processor for generating said data frames and storing each of said data frames into said transmit queue, for generating said at least one data frame copy and storing said at least one data frame copy into said secondary queue, and for placing said at least one data frame copy stored in said secondary queue into said transmit queue if a data frame is not generated by said processor.

2. Apparatus of claim 1 further comprising:

an elapsed time device for determining an elapsed time that said at least one data frame copy has been stored in said secondary queue; and said processor further for erasing said at least one data frame copy from said secondary queue if said elapsed time is equal to or greater than a predetermined time period.

3. A method for increasing the probability of successful data frame transmission from a transmitter to a receiver, comprising the steps of:

generating data frames when information is available to be transmitted to said receiver, said data frames corresponding to said information;

generating a copy of at least one of said data frames;

storing said data frames in a transmit queue;

storing said data frame copy in a secondary queue; and placing said data frame copy from said secondary queue into said transmit queue if a data frame is not generated.

4. The method of claim 3 further comprising the steps of:

determining an elapsed time that said data frame copy has been stored in said secondary queue; and erasing said data frame copy from said secondary queue if said elapsed time is equal to or greater than a predetermined time period.

5. Apparatus of claim 2 wherein said predetermined time period is equal to a round trip delay time.

6. Method of claim 4 wherein said predetermined time period is equal to a round trip delay time.

* * * * *